Dec. 18, 1962   E. L. MOODY   3,068,904
DIVERSION T
Filed May 25, 1959

INVENTOR
EUGENE L. MOODY

BY *Harman, Harman, & McCulloch*

ATTORNEYS

United States Patent Office 3,068,904
Patented Dec. 18, 1962

3,068,904
DIVERSION T
Eugene L. Moody, 1523 Owen St., Saginaw, Mich.
Filed May 25, 1959, Ser. No. 815,444
7 Claims. (Cl. 138—37)

This invention relates to T's and more particularly to certain novel and useful improvements in T's which are capable of assuring a desired proportionate flow to take-off lines.

As plumbers, steamfitters, and the like are well aware, conventional T's which are commonly used in large quantities in water supply systems and various fluid heating and circulating systems have some disadvantages. For instance, T's having threaded openings of the same size which are so disposed in the system that the input line leads into one end of the head chamber of the T and the discharge lines are connected one longitudinally opposite the input line and one leading upwardly from the neck of the T are not satisfactory for many purposes. A T so arranged in a fluid circulating system will deliver virtually all of its fluid through the longitudinally opposite side line until the longitudinally opposite line is filled. It may be, and certainly this would be the case in a sprinkling system designed for fire protection, that an equivalent flow would be desired in both output lines simultaneously.

Briefly, it is the purpose of the present invention to provide a T designed to divert or direct a proportionate quantity of the flow from the fluid supply or input line to the line which connects to the neck portion of the T while permitting the remainder of the flow to proceed through the opposite end of the head of the T in the usual manner. For this purpose, internal flow directing surfaces are provided in the T which are of particular design to function efficiently in the manner desired. Further aspects of the invention lie in the design and disposition of these surfaces and in the shaping of the walls of the T to enhance control of the flow to the lines.

It is a prime object of the invention, accordingly, to provide a directional or diversional flow T which furnishes a rapid, constant, and proportional flow to the line leading from the neck of a T which can be used in gaseous or liquid conveying systems as well as to the longitudinally opposite line.

It is a further object of the invention to provide a T which, by proportionally regulating the flow to the angularly extending line, will in many cases reduce construction and installation costs and the need for employing special valves, different size pipes, and expensive fittings.

A further object of the invention is to provide a T so designed as to provide a maximum amount of diversion with the least amount of turbulence or impedance while still providing a T which can be easily cast in the manner of conventional T's at substantially the same cost.

Still another object of the invention is to design a T of the character described which can be used in dual purpose lines wherein flow is desired in both directions and in lines which at times are drained, the T being so designed that, when used in a system which is drained, there will not be sufficient liquid remaining in the body of the T to cause corrosion problems.

Still another object of the invention is to design a T with deflector members as described which do not provide surface on which liquid can collect.

Other objects and advantages of the invention will be pointed out specifically or will become apparent from the following description when it is considered in conjunction with the appended claims and the accompanying drawings, in which:

Figure 3:
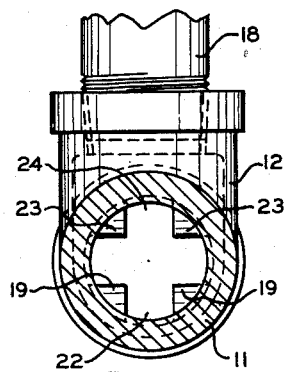
FIGURE 3 is a transverse, sectional view taken on the line 3—3 of FIGURE 1.
Figure 2:
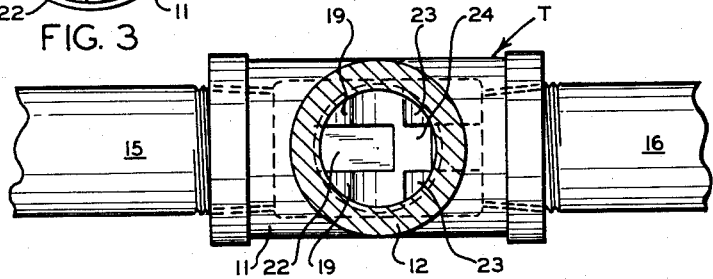
FIGURE 2 is a top plan, sectional view taken on the line 2—2 of FIGURE 1.

Referring now more particularly to the accompanying drawing, wherein I have shown a preferred embodiment of my invention only, a letter T generally indicates my novel fitting, which can be formed of any suitable metal or plastic, as desired, and is so designed that it can be easily cast or die cast. As will be seen, the T has a generally T-shaped interior or recess generally designated 10 and comprises, as usual, a head portion 11 and a neck portion 12. Threaded openings 13 and 14 provided through the ends of the head section 11 of the T receive the similarly threaded ends of the fluid supply or input pipe 15 and the longitudinally extending side takeoff line 16, respectively. The neck portion 12 of the T is also provided with a threaded communicating opening 17 for receiving the cooperatively threaded end of the angularly or normally extending pipe 18 which leads upwardly from the T. It will be observed that the internal diameter of pipes 15, 16, and 18 is the same, and applicant's T is designed to divert half of the flow from input line 15 to the line 18 without creating a turbulence in the T which would disrupt the flow and create undue back pressures or friction losses.

Provided on the interior wall of the head portion of the T at 19 are a pair of transversely spaced apart deflector sections 19 which have curvilinear and convergent upstream and downstream surfaces 19a and 19b, respectively. On the upstream side of deflectors 19 the adjacent wall of the head portion 11 of the T is curved as at 20 and at the downstream side is curved as at 21, as shown. Between the transversely spaced flow directing sections 19 a passage 22 of predetermined width leads through to the downstream side of the deflectors 19 and to the line 16 beyond. Opposite the deflector surfaces 19 at the downstream juncture of the neck portion 12 and head portion 11, deflector sections 23 extend downwardly and inwardly toward the deflectors 19. The deflector members 23 have curvilinear surfaces 23a, forming substantially a continuation of the curve of surfaces 19a, and also curved surfaces 23b, and similarly they converge to a fine edge. A like passage 24 of the same predetermined width is provided between the transversely spaced deflector members 23.

Figure 1:
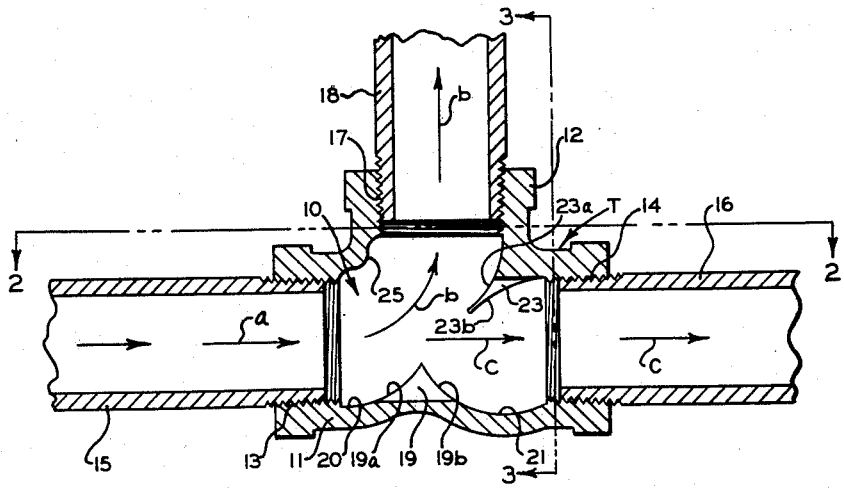
FIGURE 1 is a sectional, elevational view through the interior of my novel T, with arrows indicating the directions of flow.

At the upstream juncture of the head portion 11 and neck portion 12 an internal bead 25 reduces the volume of the passage leading to line 18. It will be observed that the surfaces 19a and 23a are curved generally on an arc generated from an axis at the point of juncture of head portion 11 and neck portion 12 and the width of passages 22 and 24 is such that the amount of water diverted or deflected through pipe 18 is substantially half the flow through pipe 15. In FIGURE 1 the arrows "a" indicate the direction of flow in pipe 15, the arrows "b" the direction of flow in and to pipe 18, and the arrows "c" the direction of flow in and to pipe 16.

The operation of the T will be readily understood from the foregoing description. Water under pressure proceeding at a particular velocity to line 15 is in part deflected upwardly by the deflector surfaces 19 and deflector surfaces 23 to the line 18 and the T is so proportioned that there is equivalent output through lines 18 and 16. With the surfaces 19a and 19b converging to an edge, no deflector provides surface on which liquid could collect to cause corrosion if it is desired to drain the line.

It should be clear to those skilled in the art that I have perfected an extremely practical T which will find use in a wide variety of systems. This T can be as easily cast as conventional T's and does not use any appreciably greater quantity of material. It is to be understood that various equivalent changes can be made in the various elements of the invention without departing from the spirit thereof or the scope of the appended claims.

I claim:

1. In a fitting for connecting a supply fluid line to a line longitudinally opposite said supply fluid line and also to a line extending generally perpendicularly to said lines for delivering a proportionate quantity of fluid to each; a hollow body member with an interior recess having oppositely disposed openings with generally axially aligned marginal walls forming passages for communication of said recess with said supply fluid line and longitudinally opposite line; said body member also having an opening with a marginal wall forming a passage for communication of said recess with said line extending axially generally perpendicularly to said supply fluid line and line longitudinally opposite said supply fluid line; a first deflector means comprising a pair of generally upwardly curving interior deflectors extending laterally to said axially aligned marginal walls from the sides thereof transversely inwardly in the path of flow from one opening to another and formed as a continuation of said marginal wall of the passage to the line longitudinally opposite said supply fluid line; said deflectors extending to a location radially inward of the marginal wall to which said fluid supply line is connected and terminating to leave a through passage between them; and second upper interior deflector means extending downwardly toward said first deflector means downstream thereof to channel flow received from said pair of deflectors to said perpendicularly extending line.

2. The combination defined in claim 1 in which second deflecting means is provided extending radially inwardly toward said first deflector means from the interior surface of the wall joining the marginal walls forming the passages communicating with the supply fluid line and the longitudinally opposite line.

3. The combination defined in claim 1 in which said wall from which said second deflecting means extends is curved outwardly on the side separated from the marginal wall forming the passage communicating with the supply fluid line by the said second deflecting means.

4. In a T connecting a supply fluid line to a line longitudinally opposite said supply fluid line and also to a line leading generally perpendicularly upwardly from said lines for delivering a proportionate supply of fluid to each; a generally T-shaped body hollowed to form a generally T-shaped interior recess with a head chamber formed by generally axially aligned marginal walls connecting with said supply fluid line and longitudinally opposite line, and a neck chamber formed by a marginal wall connecting with the said perpendicularly leading line; and diverters extending laterally inwardly from the sides of said axially aligned marginal walls, having surfaces curving inwardly into the said head chamber to divert fluid to the said neck chamber, and terminating to form a passage therebetween communicating with said longitudinally opposite line, said diverters having surfaces curved in a direction extending toward said longitudinally opposite line on the downstream wall thereof, said diverters extending inwardly and upwardly from the lower marginal wall of the said head chamber; a depending deflector being provided extending inwardly and downwardly from the interior wall of the T at the downstream junctions of the head chamber and the said neck chamber; and the wall of the said head chamber downstream of the diverters being curved outwardly to enlarge the part of the said head chamber opposite said depending deflector.

5. In a T connecting a supply fluid line to a line longitudinally opposite said supply fluid line and also to a line leading axially generally perpendicularly upwardly from said lines for delivering a proportionate supply of fluid to each; a generally T-shaped body hollowed to form a generally T-shaped interior recess with a head chamber formed by marginal walls connecting with said supply fluid line and longitudinally opposite line and a neck chamber formed by a marginal wall connecting with the said perpendicularly leading line; and spaced apart diverters having surfaces curving inwardly into the said head chamber to divert fluid to the said neck chamber and forming a passage therebetween communicating with said longitudinally opposite line; one of said spaced apart diverters extending inwardly and downwardly from the interior walls of the T at the juncture of the said head chamber and the said neck chamber remote from said supply fluid line, and the other diverter extending upwardly toward it from the opposite marginal wall of the said head chamber at a location upstream from said one diverter.

6. The combination defined in claim 5 in which said diverters have surfaces converging to an edge.

7. The combination defined in claim 5 in which said one diverter has a surface curved in a direction extending toward said longitudinally opposite line on the downstream wall thereof.

References Cited in the file of this patent

UNITED STATES PATENTS

| | | |
|---|---|---|
| 742,409 | Gallaher | Oct. 27, 1903 |
| 796,377 | Walker | Aug. 1, 1905 |
| 1,086,143 | Davidson | Feb. 3, 1914 |
| 2,065,789 | Bolsinger | Dec. 29, 1936 |
| 2,227,716 | Ingham | Jan. 7, 1941 |
| 2,284,937 | Wood | June 2, 1942 |